United States Patent
Ramesh (10) Patent No.: US 11,548,473 B1
(45) Date of Patent: Jan. 10, 2023

(54) VEHICLE OPERATOR AUTHENTICATION OPERATIONS

(71) Applicant: Micron Technology, Inc., Boise, ID (US)

(72) Inventor: Vijay S. Ramesh, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/409,515

(22) Filed: Aug. 23, 2021

(51) Int. Cl.
| | |
|---|---|
| *B60R 25/24* | (2013.01) |
| *B60R 25/04* | (2013.01) |
| *B60R 25/33* | (2013.01) |
| *G06N 20/00* | (2019.01) |
| *B60R 25/102* | (2013.01) |
| *B60R 25/30* | (2013.01) |

(52) U.S. Cl.
CPC .............. *B60R 25/24* (2013.01); *B60R 25/04* (2013.01); *B60R 25/102* (2013.01); *B60R 25/307* (2013.01); *B60R 25/33* (2013.01); *G06N 20/00* (2019.01)

(58) Field of Classification Search
CPC ......... B60R 25/00; B60R 25/01; B60R 25/20; B60R 25/24; G05D 1/00; G05D 1/02; G05D 1/021; G05D 1/024; G05D 1/214; G08G 1/16
See application file for complete search history.

(56) References Cited

U.S. PATENT DOCUMENTS

| | | | |
|---|---|---|---|
| 8,126,642 B2 | 2/2012 | Trepagnier et al. | |
| 8,948,955 B2 | 2/2015 | Zhu et al. | |
| 10,501,053 B2 * | 12/2019 | Tokunaga | B60R 25/24 |
| 2008/0161986 A1 | 7/2008 | Breed | |
| 2010/0168949 A1 | 7/2010 | Malecki et al. | |
| 2012/0226421 A1 * | 9/2012 | Kote | B60R 25/20 701/1 |
| 2021/0206346 A1 * | 7/2021 | Mukherjee | B60R 25/08 |
| 2022/0194401 A1 * | 6/2022 | Gee | B60W 40/09 |

OTHER PUBLICATIONS

NPL Search.*

* cited by examiner

*Primary Examiner* — Van T Trieu
(74) *Attorney, Agent, or Firm* — Brooks, Cameron & Huebsch, PLLC (57) ABSTRACT

An apparatus for vehicle operator authentication operations can include multiple memory devices coupled to a processor. The processor can perform an authentication operation using determined driving patterns associated with an authorized operator of a vehicle in which the apparatus is deployed and information received from a global positioning satellite and a base station to determine whether a current operator of the vehicle is the authorized operator of the vehicle and determine whether the vehicle has experienced a vehicle event. The processor can also re-allocate computing resources between the first memory device and the second memory device in response to the determination that the vehicle has experienced the vehicle event and perform, using the re-allocated computing resources, a subsequent authentication operation using the determined driving patterns and the information received from the global positioning satellite and the base station to determine whether the current operator of the vehicle is the authorized operator of the vehicle.

22 Claims, 5 Drawing Sheets

VEHICLE OPERATOR AUTHENTICATION OPERATIONS

TECHNICAL FIELD

The present disclosure relates generally to semiconductor memory and methods, and more particularly, to apparatuses, systems, and methods for vehicle operator authentication operations.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

An apparatus for vehicle operator authentication operations can include multiple memory devices coupled to a processor. The processor can perform an authentication operation using determined driving patterns associated with an authorized operator of a vehicle in which the apparatus is deployed and information received from a global positioning satellite and a base station to determine whether a current operator of the vehicle is the authorized operator of the vehicle and determine whether the vehicle has experienced a vehicle event. The processor can also re-allocate computing resources between the first memory device and the second memory device in response to the determination that the vehicle has experienced the vehicle event and perform, using the re-allocated computing resources, a subsequent authentication operation using the determined driving patterns and the information received from the global positioning satellite and the base station to determine whether the current operator of the vehicle is the authorized operator of the vehicle.

As autonomous vehicles (e.g., a vehicle such as a car, truck, bus, motorcycle, moped, all-terrain vehicle, military vehicle, tank, etc. in which at least a portion of the decision-making and/or control over vehicle operations is controlled by computer hardware and/or software, as opposed to a human operator) become increasingly prevalent, concerns regarding the security of such vehicles must be addressed. Although there exist various approaches to mitigate security concerns associated with, and hence improve the security of, autonomous vehicles, limitations in the amount and type of computing resources (e.g., computer hardware and software) that control security and driver authentication of autonomous vehicles have made improvements the security of autonomous vehicles difficult.

For example, some approaches rely on "simple" authentication, such as a physical vehicle key, passcode, vehicle operator inputs, global positioning data, or the like, to attempt to ensure that an operator of the vehicle is an authorized operator of the vehicle as part of providing security to the vehicle. These and similar authentication paradigms can leave a vehicle exposed to cyberattacks that can allow a nefarious entity to unlock, start (e.g., power on the vehicle), and, in some scenarios, steal or otherwise commission the vehicle.

In addition, such approaches can fail to adequately address situations in which the operator of the vehicle is changed during operation of the vehicle. For example, such approaches can fail to adequately address situations in which a driver and passenger attempt to switch positions in the vehicle while the vehicle is being operator or, in a worse case, when a driver and/or passenger are forced to switch positions in the vehicle as a result of a carjacking or other hostile repossession of the vehicle. Further, such approaches can expose an authorized operator vehicle to various legal risks. For example, should the vehicle be stolen, reappropriated, commissioned, or otherwise employed without the knowledge and/or consent of the authorized operator of the vehicle, the authorized operator of the vehicle may be found liable for damages caused as a result of improper usage of the vehicle.

In contrast, embodiments described herein provide multiple stages of authentication to ensure that an operator of the vehicle is an authorized operator of the vehicle. For example, embodiments herein can allow for an authorized vehicle user's driving patterns to be determined over time using any combination of global positioning satellite (GPS) data, base station data, door sensor data, seat sensor data, steering wheel sensor data, and/or internal vehicle camera data, among others. Once the authorized operator's driving patterns have been learned (e.g., through the use of machine learning algorithms), the operator of the vehicle can be authenticated using any combination of the foregoing detected and/or collected information. These authentication operations can be referred to as "routine authentication operations," herein. For example, authentication operations that are performed on start-up of a vehicle and then periodically and/or at regular or scheduled intervals based on an amount of time that has transpired since start-up of the vehicle can be referred to as "routine authentication operations."

In some embodiments, subsequent authentication operations can be performed in response to detection of a vehicle event and/or subsequently thereafter. However, in contrast to routine authentication operations, subsequent authentication operations, as described herein, can generally be performed ad hoc in response to detection of the vehicle event or, at minimum, periodically after detection of the occurrence of a vehicle event at least one periodic interval that is different than a periodic interval associated with performance of a routine authentication operation. For example, subsequent authentication operations can refer to authentication operations that are performed at least subsequent to an initial routine authentication operation performed on start-up of the vehicle and/or on a different schedule than routine authentication operations. As used herein, the term "vehicle event" generally refers to occurrences in which the vehicle ceases driving at least temporarily or an event in which the vehicle detects some kind of change in the operator of the vehicle. Non-limiting examples of a "vehicle event" can include the vehicle stopping at a stop sign, tragic signal, or other location (e.g., a traffic jam) in which the vehicle may cease moving or driving but remain powered on.

Examples are not so limited, however, and a "vehicle event" can include detection of changes to data collected by door sensors, seat sensors, steering wheel sensors, and/or internal vehicle camera data. For example, a vehicle event can correspond to an indication that a door sensor has been triggered, a seat sensor status has changed (e.g., an amount of weight present on the seat as a result of the vehicle operator sitting on the seat has changed), a position of hands on the steering wheel and/or a change in a tightness or looseness of grip on the steering wheel has been detected by the steering wheel sensors, etc. Such events can correspond to a potential breach in operator authentication (e.g., a possibility can exist that the operator of the vehicle may have changed) and/or can correspond to a determination that an urgent processing operation (e.g., an operation performed by the vehicle that may focus computing resources on the operation and may therefor represent a temporal gap in monitoring of the vehicle operator).

As described in more detail, herein, aspects of the present disclosure can allow for efficient performance of authentication operations by purposeful reallocation of computing resources available to the autonomous vehicle such that the most efficient (e.g., the fastest, most accurate, etc.) computing resources are available as needed to process information used in performance of the authentication operations to allow the autonomous vehicle to operate in a secure manner.

Some embodiments of the present disclosure allow for the execution of an application to perform authentication operations to ensure that an operator of a vehicle (e.g., an autonomous vehicle) is an authorized operator of the vehicle. As used herein, the term "application" generally refers to one or more computer programs that can include computing instructions that are executable to cause a computing system to perform certain tasks, functions, and/or activities. An amount of computing resources (e.g., processing resources and/or memory resources) consumed in execution of an application can be measured in terms of a "workload." As used herein, the term "workload" generally refers to the aggregate computing resources consumed in execution of applications that perform a certain task, function, and/or activity. During the course of executing an application, multiple sub-applications, sub-routines, etc. may be executed by the computing system. The amount of computing resources consumed in executing the application (including the sub-applications, sub-routines, etc.) can be referred to as the workload. Some applications that can give rise to demanding workloads include applications that process data, such as GPS data, satellite data, and/or sensor data in real time to perform the authentication operations described herein.

As workloads become increasingly demanding, especially in light of improvements to broadband cellular network technology, which can allow for communication between vehicles operating on a road and/or between vehicles and base station, issues associated with optimization of workload handling can become further exacerbated in autonomous vehicle deployments where physical space constraints can dictate the amount of processing resources and/or memory resources available to the autonomous vehicle.

As broadband cellular network technology evolves, higher resource demands may be placed on autonomous vehicles connected to a broadband cellular network. This can be due to increases in available bandwidth associated with broadband cellular networks (referred to herein for brevity as "networks"), which can, in turn, give rise to higher download speeds and therefore increased data traffic associated with devices connected to the network. Such increased data traffic can further give rise a greater quantity of data be received, stored, and/or processed within autonomous vehicles connected to the network.

In addition, the potential for increased data traffic involving autonomous vehicles connected to the network can allow for increasingly complicated applications (e.g., computing applications that are designed to cause a computing device to perform one or more specific functions or tasks) to be executed on the autonomous vehicle. Execution of such applications can in turn give rise to demanding workloads, which can strain computing resources and, more specifically, strain computing resources that are allocated in some conventional approaches.

In order to address the shortcomings of various approaches with respect to rapidly and accurately performing authentication operations involving a vehicle, embodiments described herein can provide hardware circuitry (e.g., a controller, processor, etc.) that can monitor and/or determine characteristics of workloads executed in a computing system of an autonomous vehicle when data corresponding to the workloads is stored in different types of memory devices. The hardware circuitry can, based on the monitored or determined characteristics of the workloads, write at least a portion of the workload to a different type of memory device. For example, if the workload is executed while the data corresponding to the workload is stored in a volatile memory device and the hardware circuitry determines that execution of the workload can be optimized if the data corresponding to the workload is stored in a non-volatile memory device, the hardware circuitry can cause at least a portion of the data corresponding to the workload to be written to the non-volatile memory device. Such dynamic determination of workload characteristics and subsequent allocation of workloads to memory devices that include different types of media can be especially beneficial in mobile computing systems, especially as increasingly processing resource intensive workloads are executed on mobile computing devices.

Non-limiting examples of how the workload can be optimized can include optimizing bandwidth associated with the computing system, computing resource consumption associated with the computing system, and/or speed of execution of the workload by the computing system, among others. For example, if the computing system is deployed in an autonomous vehicle, available computing resources of the computing device may be strained when multiple demanding workloads are executed concurrently. Accordingly, in order to optimize resource consumption and, hence resource availability of the autonomous vehicle, the hardware circuitry can cause at least a portion of the data corresponding to one or more of the workloads to be written to a memory device that is characterized by a faster memory access time when executing the workload than another memory device associated with the autonomous vehicle.

Another non-limiting example of the workload can be optimized can include optimizing execution of the workload by utilizing memory devices and/or media types that exhibit different memory capacities versus bandwidth capabilities. For example, a memory device that exhibits high capacity but low bandwidth (e.g., a NAND memory device) can be utilized for execution of some types of workloads (or portions thereof) while a memory device that exhibits high bandwidth but low capacity (e.g., a 3D stacked SDRAM memory device) can be utilized for execution of some types of workloads (or portions thereof). By leveraging the capacity of a memory device that exhibits high capacity but low bandwidth, or vice versa, for differing workloads, embodiments herein can optimize an amount of time, processing resources, and/or power consumed in executing resource intensive applications in a computing device or mobile computing device. Embodiments are not so limited, however, and other examples of optimizing execution of the workload in accordance with the disclosure are described in more detail, herein.

As described in more detail, herein, embodiments can further optimize execution of workloads in mobile computing system by writing data associated with the workloads to the memory devices based on characteristics of that data such as access frequencies of data involved in execution of the workloads. Access frequency of the data can refer to a quantity of accesses (e.g., reads, writes, etc.) involving the data in execution of the workloads. Access frequency of the data can be referred to herein in terms of "hot data" and "cold data." "Cold data," as used herein, means that a particular memory object has not been accessed for a long duration relative to other memory objects read from a memory device. "Hot data," as used herein, means that a particular memory object has been accessed frequently relative to other memory objects read from a memory device.

For example, if certain data involved in execution of a workload is determined to be "hot," such data can be written to a memory device that includes a media type that is well suited for making data quickly accessible. A non-limiting example of a memory device to which hot data can be written during execution of the workloads described herein is a volatile memory device such as a DRAM device.

In contrast, if certain data involved in execution of a workload is determined to be "cold," such data can be written to a memory device that includes a media type that is well suited for storing data that is not frequently accessed. A non-limiting example of a memory device to which cold data can be written during execution of the workloads described herein is a non-volatile memory device such as a NAND flash device.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements, e.g., elements 544-1 to 544-N (or, in the alternative, 544-1, . . . , 544-N) may be referred to generally as 544. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
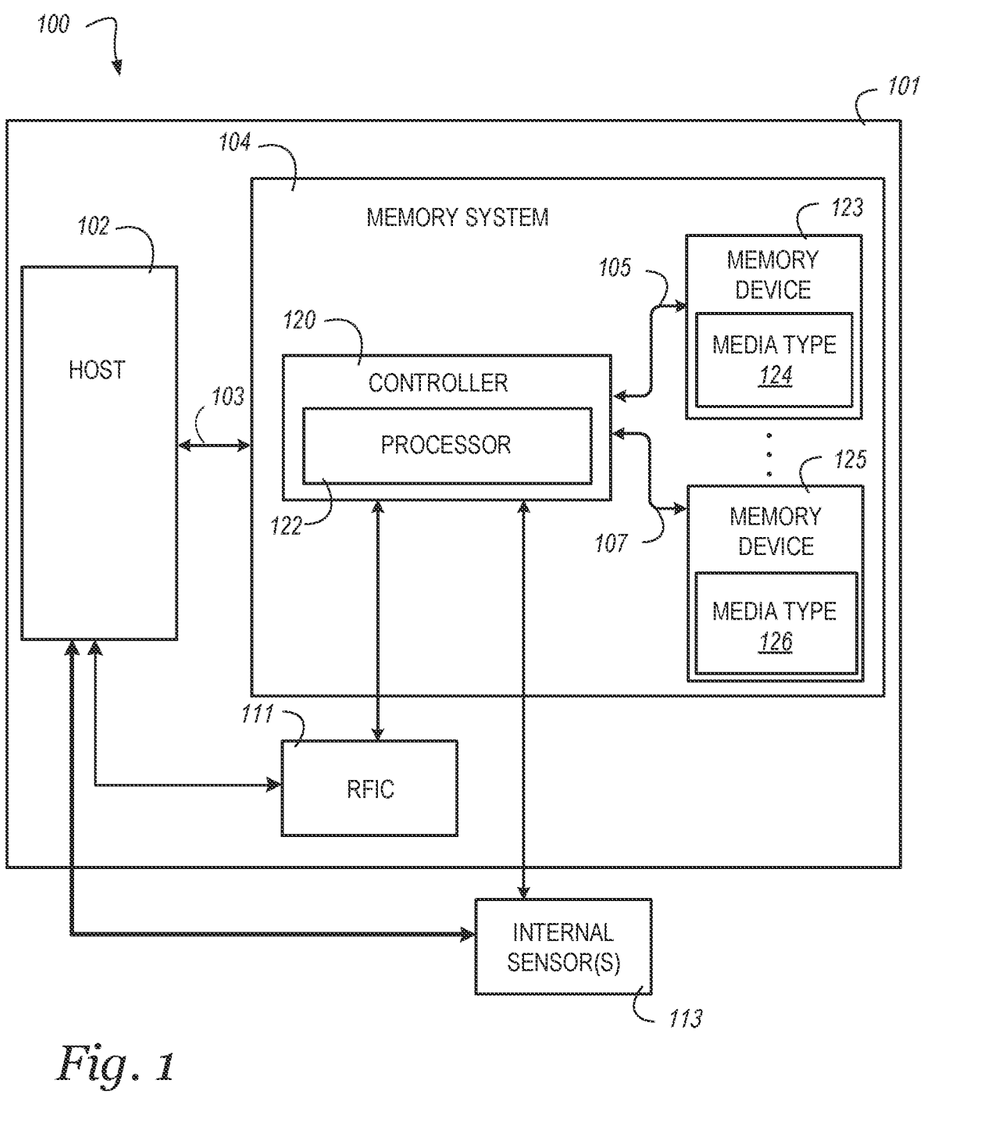
FIG. 1 is a functional block diagram in the form of an apparatus including a host and a memory device in accordance with a number of embodiments of the present disclosure.

FIG. 1 is a functional block diagram in the form of a computing system 100 including an apparatus including a host 102 and a memory system 104 in accordance with a number of embodiments of the present disclosure. In some embodiments, the host 102 and/or the memory system 104 can be part of an electronic control unit (ECU) 101 (e.g., an electronic control unit of an autonomous vehicle). As will be appreciated, an ECU 101 is an electronic component resident on an autonomous vehicle that controls the performance of one or more specific functions. Autonomous vehicles can include a large number of such ECUs 101 and it will be appreciated that the ECU 101 shown in FIG. 1 can represent a single ECU 101 or an aggregate (or portion thereof) of the ECUs resident on the autonomous vehicle. As used herein, an "apparatus" can refer to, but is not limited to, any of a variety of structures or combinations of structures, such as a circuit or circuitry, a die or dice, a module or modules, a device or devices, or a system or systems, for example. In some embodiments, the computing system 100 can be part of an autonomous vehicle (e.g., the autonomous vehicle 541 illustrated in FIG. 5, herein). For example, the computing system 100 can be resident on an autonomous vehicle. In such embodiments, the computing system 100 can control operation of the autonomous vehicle by controlling, for example, acceleration, braking, steering, parking, etc. of the autonomous vehicle.

As used herein, the term "resident on" refers to something that is physically located on a particular component. For example, the computing device 100 being resident on an autonomous vehicle refers to a condition in which the computing system 100 is physically coupled to, or physically within, the autonomous vehicle. The term "resident on" may be used interchangeably with other terms such as "deployed on" or "located on," herein.

Figure 2:
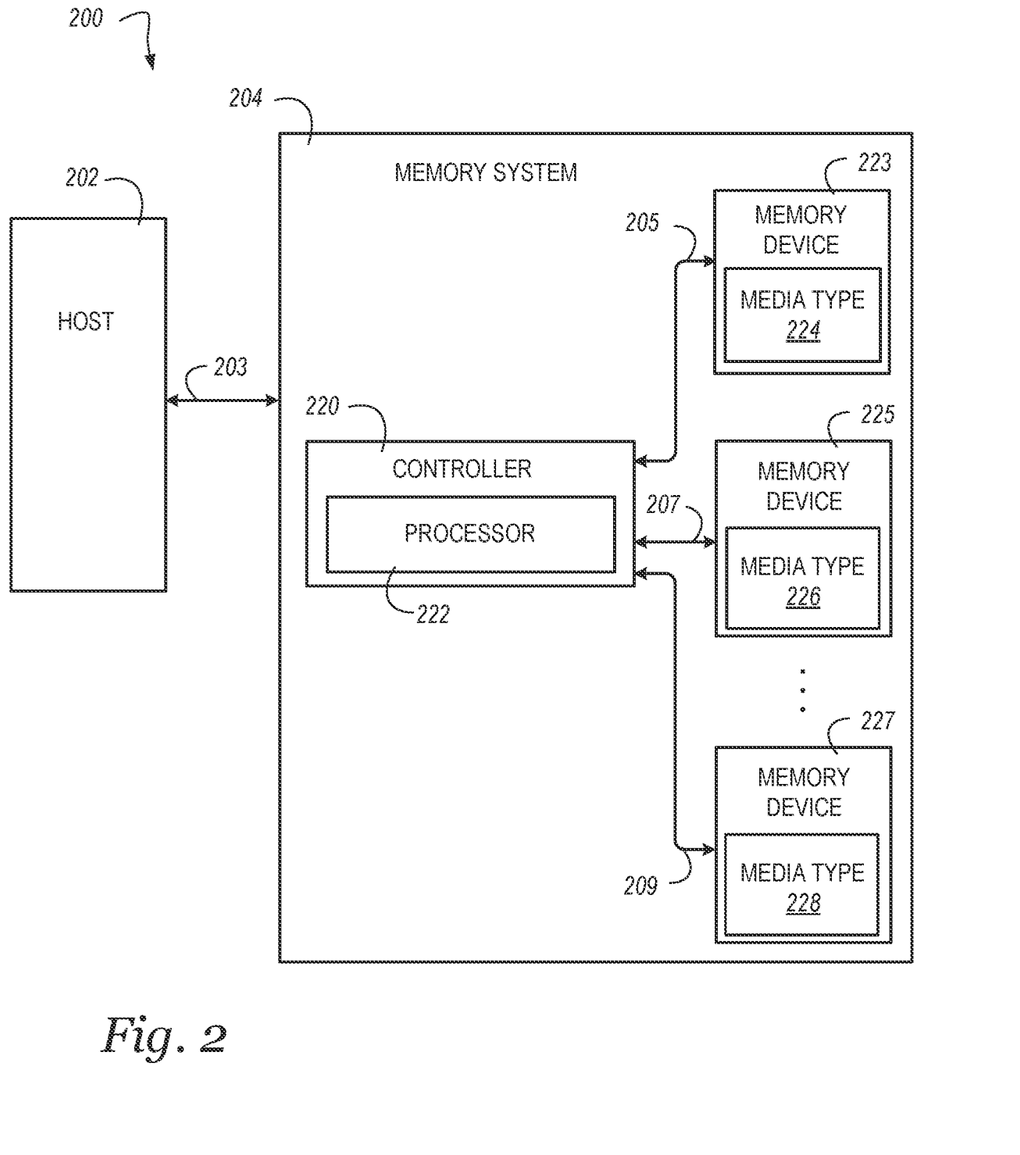
FIG. 2 is another functional block diagram in the form of a computing system including an apparatus including a host and a memory system in accordance with a number of embodiments of the present disclosure.

The memory system 104 can include a number of different memory devices 123, 125 (and/or 227 illustrated in FIG. 2, herein), which can include one or more different media types 123, 125 (and/or 227 illustrated in FIG. 2, herein). The different memory devices 123, 125, and/or 227 can include one or more memory modules (e.g., single in-line memory modules, dual in-line memory modules, etc.).

The memory system 104 can include volatile memory and/or non-volatile memory. In a number of embodiments, memory system 104 can include a multi-chip device. A multi-chip device can include a number of different memory devices 123, 125, and/or 227, which can include a number of different memory types and/or memory modules. For example, a memory system can include non-volatile or volatile memory on any type of a module. As shown in FIG. 1, the computing system 100 can include a controller 120, which can include a processor 122. Each of the components (e.g., the ECU 101, the host 102, the controller 120, the processor 122, and/or the memory devices 123, 125 can be separately referred to herein as an "apparatus."

The memory system 104 can provide main memory for the computing system 100 or could be used as additional memory and/or storage throughout the computing system 100. The memory system 104 can include one or more memory devices 123, 125, which can include volatile and/or non-volatile memory cells. At least one of the memory devices 123, 125 can be a flash array with a NAND architecture, for example. Further, at least one of the memory devices 123, 125 can be a dynamic random-access array of memory cells. Embodiments are not limited to a particular type of memory device. For instance, the memory system 104 can include RAM, ROM, DRAM, SDRAM, PCRAM, RRAM, and/or flash memory (e.g., NAND and/or NOR flash memory devices), among others.

Embodiments are not so limited, however, and the memory system 104 can include other non-volatile memory devices 123, 125 such as non-volatile random-access memory devices (e.g., NVRAM, ReRAM, FeRAM, MRAM, PCM), "emerging" memory devices such as resistance variable (e.g., 3-D Crosspoint (3D XP)) memory devices, memory devices that include an array of self-selecting memory (SSM) cells, memory devices that operate according to a compute express link (CXL) protocol, etc., or any combination thereof.

Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

In some embodiments, the memory system 104 can be a Compute Express Link (CXL) compliant memory system (e.g., the memory system can include a PCIe/CXL interface). CXL is a high-speed central processor (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface. In some embodiments, the CXL technology can include a plurality of I/O lanes configured to transfer a plurality of commands to or from circuitry external to the controller 120, such as the memory devices 123, 125, 227 and/or the host 102 at a rate of around thirty-two (32) giga-transfers per second. In another embodiments, the CXL technology can comprise a peripheral component interconnect express (PCIe) 5.0 interface coupled to a plurality of I/O lanes, and the controller 120 is to receive commands involving at least one of a first memory device 123 or a second memory device 125, or both, via the PCIe 5.0 interface according to a compute express link memory system.

As shown in FIG. 1, the memory devices 123, 125 include different types of memory devices. For example, the memory device 125 can be a non-volatile memory device, such as a resistance variable memory device, a memory device that operates according to the CXL protocol, a 3D XP memory device, or a NAND memory device, among others, and the memory device 123 can be a volatile memory device, such as a DRAM device, or vice versa. That is, the memory devices 123, 125 can include different media types 124, 126. Embodiments are not so limited, however, and the memory devices 123, 125 can include any type of memory devices provided that at least two of the memory devices 123, 125 include different media types 124, 126. As used herein, a "media type" generally refers to a type of memory cell architecture that corresponds to the memory devices 123, 125. For example, one of the media types 124, 126 can correspond to an array of memory cells that includes at least one capacitor and at least one transistor, while another of the media types 124, 126 can include an array of floating-gate metal-oxide-semiconductor field-effect transistors. In some embodiments, at least one of the media types 124, 126 can include an array of resistance variable memory cells that are configured to perform bit storage based on a change in a bulk resistance associated with the resistance variable memory cells.

As illustrated in FIG. 1, a host 102 can be coupled to the memory system 104. In a number of embodiments, the memory system 104 can be coupled to the host 102 via one or more channels (e.g., channel 103). In FIG. 1, the memory system 104 is coupled to the host 102 via channel 103, which can, in addition, be coupled to the controller 120 and/or the processor 122 of the memory system 104. The controller 120 and/or the processor 122 are coupled to the memory devices 123, 125 via channel(s) 105, 107. In some embodiments, each of the memory devices 123, 125 are coupled to the controller 120 and/or the processor 122 by one or more respective channels 105, 107 such that each of the memory devices 123, 125 can receive messages, commands, requests, protocols, or other signaling that is compliant with the type of memory device 123, 125 (e.g., messages, commands, requests, protocols, or other signaling that is compliant with the media type 124, 126 of the memory devices 123, 125) coupled to the controller 120.

The ECU 101 can further include a radio-frequency integrated circuit (RFIC) 111. As used herein, the term "RFIC" generally refers to an electrical integrated circuit that operates in a frequency range suitable for wireless transmission. In some embodiments, the RFIC 111 can facilitate communications between an autonomous vehicle (e.g., the autonomous vehicle 541 illustrated in FIG. 5, herein), a base station (e.g., the base station 543 illustrated in FIG. 5, herein) and/or other autonomous vehicles operating on a road or street on which the autonomous vehicle that includes the RFIC 111 is operating.

As shown in FIG. 1, the system 100 (e.g., the autonomous vehicle) further includes internal sensor(s) 113. The internal sensors can include sensors that are associated with various internal components of the vehicle. Non-limiting examples of such sensors include door sensors (e.g., sensors to determine whether a door of the vehicle has been opened or closed), steering wheel sensors (e.g., sensors to detect whether an operator of the vehicle is touching the steering wheel), seat sensors (e.g., sensors to determine whether a person is sitting in the seats of the vehicle and, if so, how much the person weighs, for example), internal cameras (e.g., sensors to provide facial detection and recognition of operators and/or passengers of the vehicle), etc.

In addition, the system 100 and/or the ECU 101 can further various sensors that are not shown so as to not obfuscate the drawings. For example, the ECU 101 can include inertial sensors, radar sensors, LIDAR sensors, etc. that can be used to assist in navigation and operation of the autonomous vehicle.

The host 102 can be a host system such as a personal laptop computer, a desktop computer, a digital camera, a smart phone, a memory card reader, and/or an internet-of-things (IoT) enabled device, among various other types of hosts. In some embodiments, however, the host 102 includes one or more central processors that execute instructions to control operation of an autonomous vehicle.

One of ordinary skill in the art will appreciate that "a processor" can intend one or more processors, such as a parallel processing system, a number of coprocessors, etc. The system 100 can include separate integrated circuits or one or more of the host 102, the memory system 104, the control circuitry 120, and/or the memory devices 123, 125 can be on the same integrated circuit. The computing system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

The memory system 104 can include a controller 120, which can include a processor 122. The processor 122 can be provided in the form of an integrated circuit, such as an application-specific integrated circuit (ASIC), field programmable gate array (FPGA), reduced instruction set computing device (RISC), advanced RISC machine, system-on-a-chip, or other combination of hardware and/or circuitry that is configured to perform operations described in more detail, herein. In some embodiments, the processor 122 can comprise one or more processors (e.g., processing device(s), co-processors, etc.).

The processor 122 can perform operations to monitor and/or determine characteristics of workloads running on the memory system 104. The characteristics can include information such as bandwidth consumption, memory resource consumption, access frequency (e.g., whether the data associated with one or more of the workloads is hot or cold), and/or power consumption in execution of the workloads, among others. The processor 122 can control writing of at least a portion of data associated with an authentication operation for an autonomous vehicle to a different memory device 123, 125 in order to optimize execution of the workload corresponding to the authentication operation, and/or balance the workload corresponding to the authentication operation between different memory devices 123, 125 for media management purposes among others.

In a non-limiting example, an apparatus (e.g., the computing system 100) can include a processor 122, a first memory device 123 comprising a first type of media 124, and a second memory device 125 comprising a second type of media 126. The processor 122 first memory device 123, the second memory device 125, and the processor 122 can, in some embodiments, be resident on an autonomous vehicle (e.g., the autonomous vehicle 541 illustrated in FIG. 5, herein). The processor 122 can be coupled to the first memory device 123 and the second memory device 125.

The processor 122 can perform an authentication operation using determined driving patterns associated with an authorized operator of a vehicle in which the apparatus is deployed; information received from a global positioning satellite (GPS); and information received from a base station to determine whether a current operator of the vehicle is the authorized operator of the vehicle. As used herein, a "base station" generally refers to equipment that generate and receive electromagnetic radiation within a particular frequency range and facilitate transfer of data or other information between the base station and computing devices (e.g., mobile computing devices such as smartphones, etc.) that are within the network coverage area of the base station. Several non-limiting examples of frequency ranges that a base station can generate and receive can include 700 MHz-2500 MHz (in the case of a 4G base station) or 28 GHz-39 GHz (in the case of a 5G base station).

If it is determined that current operator of the vehicle is not the authorized operator of the vehicle, the processor 122 can transmit a notification to the authorized operator of the vehicle and/or disable the vehicle, among other actions to ensure the security of the vehicle. On the other hand, if it is determined that the current operator of the vehicle is the authorized operator of the vehicle, the processor 122 can allow continued operation of the vehicle.

The processor 122 can determine whether the vehicle has experienced a vehicle event and re-allocate computing resources between the first memory device and the second memory device in response to the determination that the vehicle has experienced the vehicle event. In some embodiments, the vehicle event can include at least one of the vehicle stopping for greater than a threshold period of time, starting, and/or a detection of a change in captured internal vehicle sensor data.

In some embodiments, the processor 122 can perform, using the re-allocated computing resources, a subsequent authentication operation using the determined driving patterns and the information received from the global positioning satellite and the base station to determine whether the current operator of the vehicle is the authorized operator of the vehicle. Embodiments are not so limited, however, and in some embodiments, the processor 122 can perform at least one of the authentication operation or the subsequent authentication operation, or both, using internal vehicle sensor data in addition to the GPS and/or station information using the re-allocated computing resources.

The processor 122 can re-allocate the computing resources between the first memory device and the second memory device based, at least in part, on determined environmental characteristics in which the vehicle is operating. As used herein, the term "environmental characteristics" generally refers to various conditions that can be encountered by the vehicle while the vehicle is operating. Non-limiting examples of environmental characteristics can include weather conditions, traffic conditions, the presence (or absence) of road construction (e.g., whether there are traffic barriers, road construction signs, detours, etc.), and/or the presence (or absence) of traffic signs (e.g., is the vehicle being operated on a highway that includes relatively few traffic signs as opposed to in a city that contains relatively more traffic signs), among other conditions that the vehicle may encounter during operation.

Continuing with this example embodiment, the processor 122 can execute one or more sets of machine learning instructions to determine the driving patterns associated with the authorized operator of the vehicle over time. Execution of a machine learning operation can include execution of instruction to perform operations using training data to make predictions and/or learn behavior over time. For example, the instructions can be executed while the authorized driver is operating the vehicle to predict and/or learn driving patterns, such as general speeds at which the operator operates the vehicle, lane changing behavior of the operator, braking behavior, and/or preferred or common routes the operator follows, among others. In some embodiments, prediction and/or learning of driving behavior of an authorized operator of the vehicle over time can allow for deviations from the learned driving patterns to be detected and can, in some embodiments, cause an application initiation indicator to be generated to cause performance of an authentication operation to determine whether the operator of the vehicle is the authorized operator of the vehicle.

In some embodiments, the processor 122 can determine characteristics of the first memory device 123 and the second memory device 125 prior to re-allocation of the computing resources between the first memory device 123 and the second memory device 125. Non-limiting examples of characteristics that may be determined by the processor can include bandwidth, memory access time, latency, and/or memory cell density characteristics of the first memory device 123 and/or the second memory device 125. For example, the processor 122 can re-allocate the computing resources between the first memory device 123 and the second memory device 125 such that greater than a threshold amount of computing resources that exhibit a higher bandwidth, a faster memory access time, and/or a lower latency than other computing resources available to the vehicle are available to perform the subsequent authentication operation and/or further subsequent authentication operations.

The processor 122 can reallocate computing resources among the first memory device 123 and the second memory device 125 based, at least in part, on determined characteristics of the first memory device 123 and the second memory device 125 in response to receipt of an application initiation indicator. In some embodiments, the application initiation indicator can be generated in response to detection of the occurrence of a vehicle event. Embodiments are not so limited, however, and in some embodiments, the application initiation indicator can be generated in response to a determination that driving patterns of the operator of the vehicle have deviated from predicted and/or learned driving patterns of the authorized operator of the vehicle. The processor 122 can determine the characteristics of the first memory device 123 and the second memory device 125 prior to, or during, execution of the application. In some embodiments, the determined characteristics of the first memory device 123 and the second memory device 125 can include a bandwidth, a memory access time, a latency, and/or a memory cell density, among other characteristics, of the first memory device 123 and the second memory device 125.

In some embodiments, the processor 122 can process information received from a GPS (e.g., the GPS 547 illustrated in FIG. 5, herein), a base station (e.g., the base station 543 illustrated in FIG. 5, herein), and/or one more internal sensor(s) 113. In some embodiments, the operation to process received information captured by the imaging device 121 can involve an application having a particular workload corresponding thereto. The processor 122 can determine characteristics of the workload when the workload is written to the first memory device 123 or the second memory device 125. In some embodiments, the characteristics of the workload can include at least one of an access frequency of data associated with the workload, a latency associated with execution of the workload, and/or an amount of processing resources consumed in execution of the workload. In some embodiments, the application and/or the workload can involve processing of data received and/or captured by the imaging device 121.

The processor 122 can determine, based on the characteristics of the workload, whether to write at least a portion of data associated with the workload to the other of the first memory device 123 or the second memory device 125 and control allocation of execution of the workload that is written to the other of the first memory device 123 or the second memory device 125 such that at least the portion of the workload is subsequently executed after at least the portion of the workload has been written to the other of the first memory device 123 or the second memory device 125. In some embodiments, the subsequently executed workload can involve processing of data received from the GPS, the base station and/or the internal sensor(s) 113.

As mentioned above, the first memory device 123 or the second memory device 125 can be a non-persistent (e.g., volatile) memory device, and the other of the first memory device 123 or the second memory device 125 can be a persistent (e.g., non-volatile) memory device. In addition, as mentioned above, in some embodiments, the first type of memory or the second type of memory, or both, comprises sets of memory cells that exhibit different storage characteristics. For example, the first memory device 123 can have a first media type 124 and the second memory device 125 can have a second media type 126 associated therewith.

Figure 3:
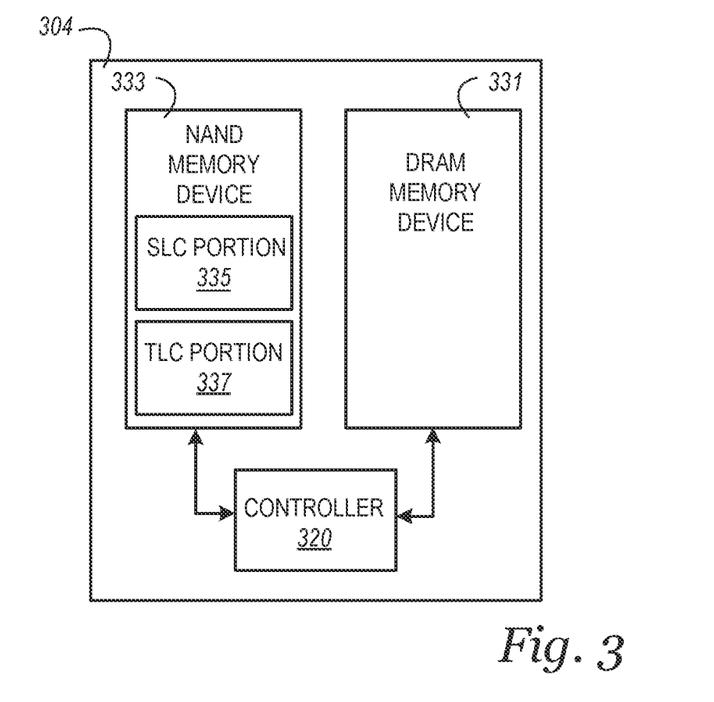
FIG. 3 is a functional block diagram in the form of an apparatus including a memory system in accordance with a number of embodiments of the present disclosure.
Figure 4:
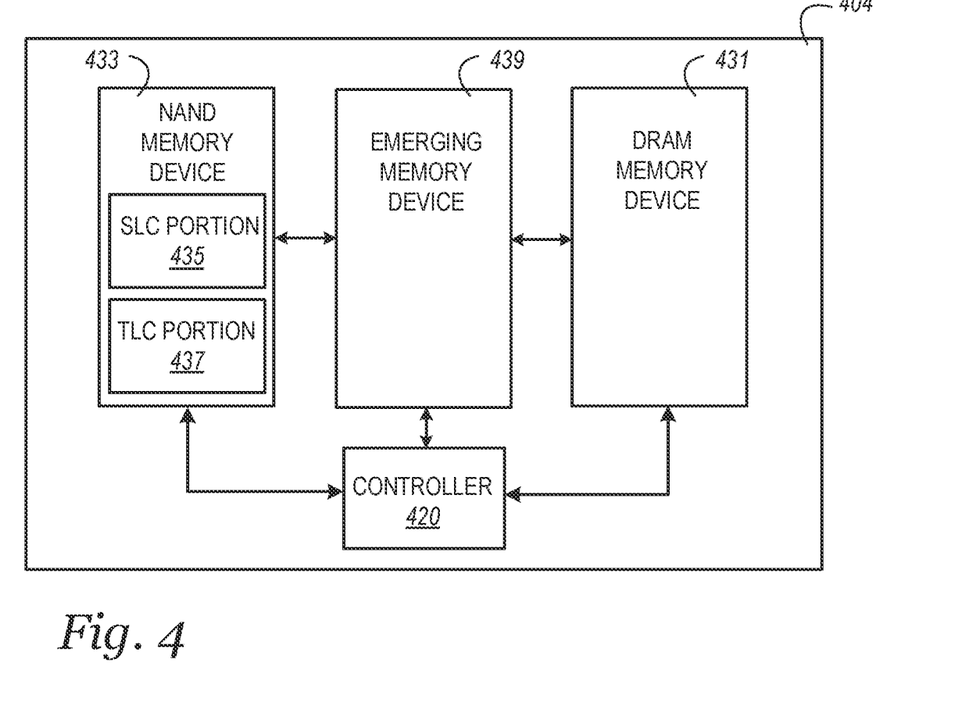
FIG. 4 is another functional block diagram in the form of an apparatus including a memory system in accordance with a number of embodiments of the present disclosure.

Continuing with the above non-limiting example, the first memory device 123 or the second memory device 125 can be a NAND flash memory device that comprises a set of single level memory cells (SLCs) and a set of multi-level memory cells (MLCs), as shown in FIGS. 3 and 4, herein. In such embodiments, the processor 122 can write at least the portion of the data associated with the workload to the set of SLC memory cells or the set of MLC memory cells based, at least in part, on receipt of the application initiation indicator. In some embodiments, the set of SLCs can be configured to store a look-up table to facilitate writing of at least the portion of the data to the other of the first memory device 123 or the second memory device 125.

As used herein, the term "look-up table" generally refers to a data structure that contains indexing information that can correspond to desired output formats of data written to the memory system 104. For example, the look-up table can include pre-fetched information that can be used by the memory system 104 to output various types of data processed by the memory system in a requested format. In some embodiments, the look-up table can be included in a flash memory device, such as the NAND memory device 333, for example, in the SLC portion 335 of the NAND memory device 333. The look-up table can store data corresponding to artificial intelligence and/or machine learning applications. In such embodiments, it may be beneficial to store the look-up table in a SLC portion of the memory device, as SLC memory generally offers high access speeds and accurate storage. In some embodiments, such artificial intelligence and/or machine learning applications can be executed in connection with performance of the operations described herein.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory system 104 and/or the memory devices 123, 125. It will be appreciated by those skilled in the art that the number of address input connections can depend on the density and architecture of the memory system 104 and/or the memory devices 123, 125.

FIG. 2 is another functional block diagram in the form of a computing system 200 including an apparatus including a host 202 and a memory system 204 in accordance with a number of embodiments of the present disclosure. In some embodiments, the computing system 200 can be resident on an autonomous vehicle, such as the autonomous vehicle 541 illustrated in FIG. 5, herein. The memory system 204 can include a number of different memory devices 223, 225, 227, which can include one or more different media types 223, 225, 227. The different memory devices 223, 225, and/or 227 can include one or more memory modules (e.g., single in-line memory modules, dual in-line memory modules, etc.). The host 202, memory system 204, controller 220, processor 222, memory devices 223, 225 and/or the media types 224, 226 can be analogous to the host 102, memory system 104, controller 120, processor 122, memory devices 123, 125 and/or the media types 124, 126 illustrated in FIG. 1, herein.

In some embodiments, each of the memory devices 223, 225, and 227 can be a different type of memory device. Accordingly, in some embodiments, each of the memory devices 223, 225, and 227 can include different media types 224, 226, and 228. In a non-limiting example, the memory device 223 can be a volatile memory device, such as a DRAM device and can include a media type 224 that corresponds to a DRAM memory device (e.g., an array of memory cells that include at least one capacitor and at least one transistor). Continuing with this example, the memory device 225 can be a flash memory device, such as a NAND memory device and can include a media type 226 that corresponds to a NAND memory device (e.g., comprises an array of floating-gate metal-oxide-semiconductor field-effect transistors). In this non-limiting example, the memory device 227 can be an emerging memory device (e.g., the emerging memory device 439 illustrated in FIG. 4, herein), such as the emerging memory devices described above, and can include a media type 228 that corresponds to an emerging memory device (e.g., an array of resistance variable memory cells that are configured to perform bit storage based on a change in a bulk resistance associated with the resistance variable memory cells, an array of self-selecting memory cells, an array of memory cells that operate according to the CXL protocol, etc.).

The memory devices 223, 225, and 227 can be configured to read, write, and/or store data, such as GPS data, base station data, and/or internal sensor data corresponding to one or more workloads executed by the computing system 200. An application corresponding to the workload (e.g., corresponding to performance of the authentication operation) can be executed by, for example, the processor 222, and in response to receipt of an application initiation indicator, to cause the data to be written to the memory devices 223, 225, and 227 to be used in execution of the application and/or workload. In some embodiments, the controller 220 can pre-allocate resources amongst the memory devices 223, 225, and/or 227 in response to receipt of the application initiation indicator but prior to performance of an authentication operation. In such embodiments, the controller 220 can ensure that there are adequate computing resources and/or memory resources available to the memory device(s) 223, 225, and/or 227 with which the authentication operation will be performed. That is, in some embodiments, the controller 220 can control writing at least a portion of the data to a memory device that has had at least a portion of the computing resources associated with the memory device re-allocated (e.g., in response to receipt of an application initiation indicator generated as a result of the vehicle experiencing a vehicle event) prior to receipt of GPS data, the base station data, and/or the internal sensor data based on characteristics of the workload.

Embodiments are not so limited, however, and in some embodiments, the controller 220 can control writing at least a portion of the data to a different memory device than the memory device in which the data is initially written based on characteristics of the workload. For example, if data corresponding to a particular workload (e.g., an authentication operation for an autonomous vehicle) is stored in the memory device 223, the controller 220 and/or the processor 222 can, in response to a determination that the workload may be more efficiently executed (e.g., optimized) using a different memory device, cause at least a portion of the data corresponding to the particular workload to be written to the memory device 225 and/or to the memory device 227.

In some embodiments, the controller 220 can control movement of data among the memory devices 223, 225, and/or 227 by copying and/or writing data from one of the memory devices 223, 225, and/or 227 to a different one of the memory devices 223, 225, and/or 227 to ensure that there are adequate computing resources and/or memory resources available to the memory device(s) 223, 225, and/or 227 with which the authentication operation will be performed. For example, the controller 220 can determine that cold data and/or data corresponding to lower priority applications are running using a memory device that has characteristics that may be desirable for performance of the authentication operation. In such scenarios, the controller 220 can cause the cold data and/or the data corresponding to the lower priority applications to a different memory device to ensure that there are adequate memory resources available to the memory device that has characteristics that may be desirable for performance of the authentication operation to receive data corresponding to the authentication and to perform the authentication operation. In some embodiments, the controller 220 can perform these operations in response to receipt of the application initiation indicator.

Figure 5:
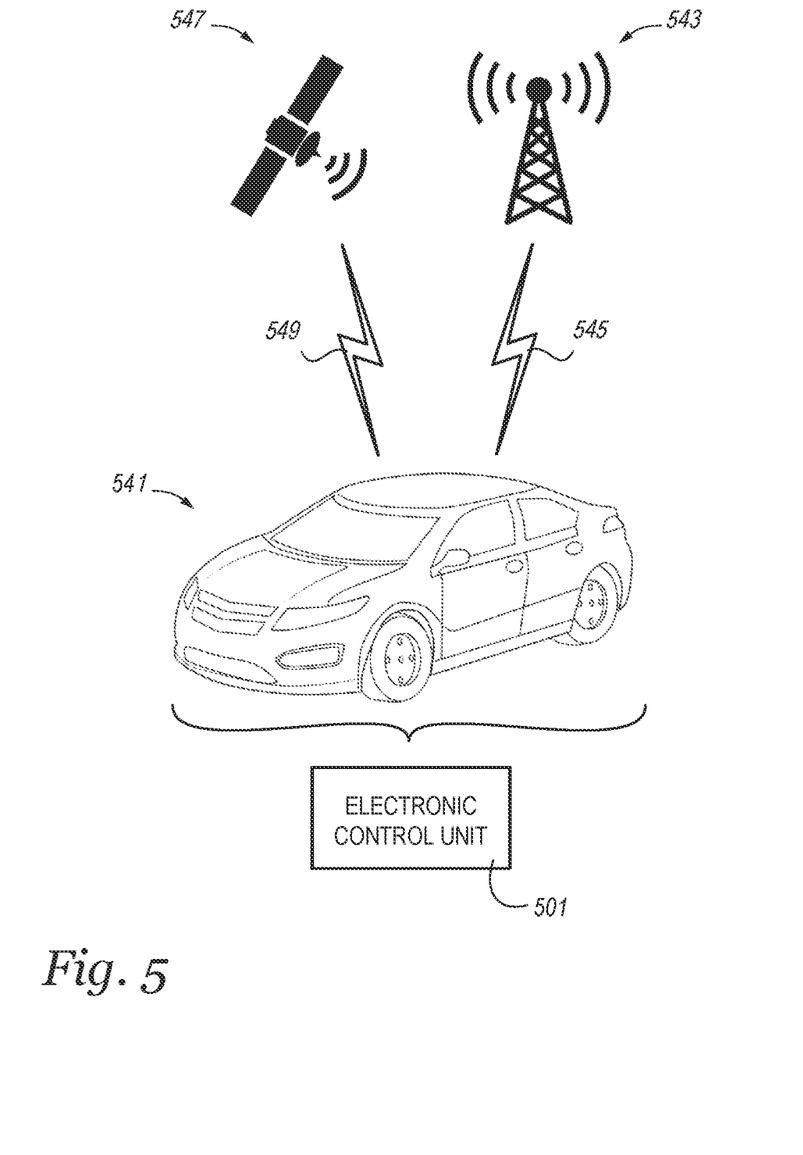
FIG. 5 is a diagram illustrating an autonomous vehicle that includes an electronic control unit in accordance with a number of embodiments of the present disclosure.

In a non-limiting example, a system (e.g., the computing system 200 and/or the autonomous vehicle 501 illustrated in FIG. 5, herein) can include a memory system 204 comprising a processor 222, a first memory device 223 comprising a first type of media 224, a second memory device 225 comprising a second type of media 226, and a third memory device 227 comprising a third type of media 228. In some embodiments, the first memory device 223 can be a dynamic random-access memory device, the second memory device 225 can be a NAND flash memory device, and the third memory device 227 can be an emerging memory device, such as a CXL compliant memory device, a 3D XP memory device, a self-selecting cell memory device, etc., as described above.

In at least one embodiment, the media type 224 comprises an array of memory cells that include at least one capacitor and at least one transistor, the media type 226 comprises an array of floating-gate metal-oxide-semiconductor field-effect transistors, and the type of media 228 comprises an array of resistance variable memory cells that are configured to perform bit storage based on a change in a bulk resistance associated with the resistance variable memory cells.

The processor 222 can reallocate computing resources among the first memory device 223, the second memory device 225, or the third memory device 227, or any combination thereof based, at least in part, on characteristics of the first memory device 223, the second memory device 225, and the third memory device 227 in response to generation of the application initiation indicator, which can be generated in response to determining that the autonomous vehicle has experienced a vehicle event. As described herein, the processor 222 can determine the characteristics of the first memory device 223, the second memory device 225, and the third memory device 227 prior to, or during, execution of the application to authenticate an operator of the autonomous vehicle, while the determined characteristics of the first memory device 223, the second memory device 225, and the third memory device 227 can include a bandwidth, a memory access time, a latency, a memory cell density, or any combination thereof, of the first memory device 223, the second memory device 225, and the third memory device 227. In some embodiments, the processor 222 can reallocate the computing resources such that greater than a threshold amount of computing resources are available to the memory device that exhibits characteristics that are consistent with processing and/or performing operations described herein.

The processor 222 can write at least a portion of data to be used in performance of an authentication operation to the first memory device 223, the second memory device 225, and/or or the third memory device 227 in response to generation of the application initiation indicator. In some embodiments, the processor 222 can execute the application corresponding to detection of the abnormality in at least the portion of the living creature while the one or more images captured by the imaging device are written to the first memory device 223, the second memory device 225, or the third memory device 227, or any combination thereof.

In embodiments in which the memory system 204 is resident on an autonomous vehicle, the processor 222 can execute one or more sets of machine learning instructions to determine the characteristics of the first memory device 223, the second memory device 225, and the third memory device 227 based, at least in part, on monitored benchmark data associated with the first memory device 223, the second memory device 225, and the third memory device 227. As used herein, the term "benchmark data" generally refers to data that can be used to test characteristics of a memory device 204, such as read/write speed, throughput, bandwidth, accuracy, and/or data retention, among other test data that indicates the overall performance of the memory device 204. In such embodiments, the processor 222 can reallocate the computing resources among the first memory device 223, the second memory device 225, or the third memory device 227, or any combination thereof based, at least in part, on the determined characteristics of the first memory device 223, the second memory device 225, and the third memory device 227.

In some embodiments, the processor 222 can determine the characteristics of the executed workload while the data to be used in performance of the authentication operation is written to the memory device 223, the memory device 225, or the memory device 227 by monitoring at least one of an access frequency of data associated with the workload, a latency associated with execution of the workload, and/or an amount of processing resources consumed in execution of the workload and write at least the portion of data associated with the workload to at least one of the other of the memory device 223, the memory device 225, or the memory device 227 based, at least on part, on the determined access frequency of data associated with the workload, the latency associated with execution of the workload, and/or the amount of processing resources consumed in execution of the workload.

In some embodiments, at least a portion of the data to be used in performance of the authentication operation that is written to the memory device 223, the memory device 225, or the memory device 227 is formatted according to a universal number format or a posit format. In contrast to the IEEE 754 floating-point or fixed-point binary formats, which include a sign bit sub-set, a mantissa bit sub-set, and an exponent bit sub-set, universal number formats, such as posits include a sign bit sub-set, a regime bit sub-set, a mantissa bit sub-set, and an exponent bit sub-set. This can allow for the accuracy, precision, and/or the dynamic range of a posit to be greater than that of a float, or other numerical formats. In addition, posits can reduce or eliminate the overflow, underflow, NaN, and/or other corner cases that are associated with floats and other numerical formats. Further, the use of posits can allow for a numerical value (e.g., a number) to be represented using fewer bits in comparison to floats or other numerical formats.

As used herein, a "precision" refers to a quantity of bits in a bit string that are used for performing computations using the bit string. For example, if each bit in a 16-bit bit string is used in performing computations using the bit string, the bit string can be referred to as having a precision of 16 bits. However, if only 8-bits of a 16-bit bit string are used in performing computations using the bit string (e.g., if the leading 8 bits of the bit string are zeros), the bit string can be referred to as having a precision of 8-bits. As the precision of the bit string is increased, computations can be performed to a higher degree of accuracy. Conversely, as the precision of the bit string is decreased, computations can be performed using to a lower degree of accuracy. For example, an 8-bit bit string can correspond to a data range consisting of two hundred and fifty-five (256) precision steps, while a 16-bit bit string can correspond to a data range consisting of sixty-five thousand five hundred and thirty-six (63,536) precision steps.

As used herein, a "dynamic range" or "dynamic range of data" refers to a ratio between the largest and smallest values available for a bit string having a particular precision associated therewith. For example, the largest numerical value that can be represented by a bit string having a particular precision associated therewith can determine the dynamic range of the data format of the bit string. For a universal number (e.g., a posit) format bit string, the dynamic range can be determined by the numerical value of the exponent bit sub-set of the bit string.

A dynamic range and/or the precision can have a variable range threshold associated therewith. For example, the dynamic range of data can correspond to an application that uses the data and/or various computations that use the data. This may be due to the fact that the dynamic range desired for one application may be different than a dynamic range for a different application, and/or because some computations may require different dynamic ranges of data. Accordingly, embodiments herein can allow for the dynamic range of data to be altered to suit the requirements of disparate applications and/or computations. In contrast to approaches that do not allow for the dynamic range of the data to be manipulated to suit the requirements of different applications and/or computations, embodiments herein can improve resource usage and/or data precision by allowing for the dynamic range of the data to varied based on the application and/or computation for which the data will be used.

FIG. 3 is a functional block diagram in the form of an apparatus including a memory system 304 in accordance with a number of embodiments of the present disclosure. FIG. 3 illustrates a memory system 304, which can be analogous to the memory system 104 illustrated in FIG. 1 and/or the memory system 204 illustrated in FIG. 2, herein. As shown in FIG. 3, the memory system 304 includes a controller 320 (which can be analogous to the controller 120 illustrated in FIG. 1 and/or the controller 220 illustrated in FIG. 2, herein), a DRAM memory device 331 (which can be analogous to one of the memory devices 123, 125 illustrated in FIG. 1 and/or one of the memory devices 223, 225, 227 illustrated in FIG. 2, herein), and a NAND memory device 333 (which can be analogous to one of the memory devices 123, 125 illustrated in FIG. 1 and/or one of the memory devices 223, 225, 227 illustrated in FIG. 2, herein).

As shown in FIG. 3, the NAND memory device 333 can include various portions of memory cells, which can include a set of single level memory cells (SLCs) 335 and a set of multi-level memory cells (MLCs), such as a set of triple-level memory cells (TLCs) 337, quad-level cells (QLCs), etc. In some embodiments, the controller can cause at least a portion of data corresponding to an image or sequence of images, such as images of blood cells within a blood vein, used by an application to detect abnormalities in the blood that is executed on the memory system 304 to be written to the SLC portion 335 and/or or the TLC portion 337 based on the characteristics of the application (e.g., in response to receipt of an application initiation indicator) involving the data.

In some embodiments, data that is classified as hot data can be written to the SLC portion 335 while data that is classified as cold data can be written to the TLC portion 337, or vice versa, as part of optimizing performance of the memory system 304 during execution of the application and corresponding workloads. By selectively writing portions of data involved in execution of the application to different memory portions (e.g., to a SLC portion 335 and/or a TLC portion 337) of the NAND memory device 333, performance of the computing system, especially during execution of applications to detect abnormalities in blood described herein, can be improved in comparison to some approaches. Embodiments are not so limited, however, and in some embodiments, hot data can be written to the DRAM memory device, colder data can be written to the NAND memory device 333, and cold data can be written to the emerging memory device 339.

For example, by selectively writing portions of data that correspond to workloads that benefit from rapid execution, such as the authentication operations described herein, to the DRAM memory device 331 and/or to the SLC portion 335 while writing portions of data that correspond to execution of applications and workloads that may not benefit as much from rapid execution to the TLC portion 337 and/or to an emerging memory device (e.g., the emerging memory device 439 illustrated in FIG. 4), workloads, such as those that arise from performing the authentication operations described herein, can be allocated to memory devices within the memory system 304 that can allow for optimized execution of the workloads within the memory system 304.

In some embodiments, at least a portion of the SLC portion 335 of the NAND memory device 333 can be allocated for storage of a look-up table. The look-up table can be a data structure that contains indexing information that can correspond to desired output formats of data written to or from the memory system 304. For example, the look-up table can include pre-fetched information that can be used by the memory system 304 to output various types of data processed by the memory system 304 in a requested format. In some embodiments, the look-up table can facilitate writing of at least a portion of data involved in a workload to one of the memory devices described herein.

FIG. 4 is another functional block diagram in the form of an apparatus including a memory system 404 in accordance with a number of embodiments of the present disclosure. FIG. 4 illustrates a memory system 404, which can be analogous to the memory system 104 illustrated in FIG. 1, the memory system 204 illustrated in FIG. 2, and/or the memory system 304 illustrated in FIG. 3, herein.

As shown in FIG. 4, the memory system 404 includes a controller 420 (which can be analogous to the controller 120 illustrated in FIG. 1, the controller 220 illustrated in FIG. 2, and/or the controller 320 illustrated in FIG. 3, herein), a DRAM memory device 431 (which can be analogous to one of the memory devices 123, 125 illustrated in FIG. 1, one of the memory devices 223, 225, 227 illustrated in FIG. 2, and/or one of the DRAM memory device 331 illustrated in FIG. 3, herein), a NAND memory device 433 (which can be analogous to one of the memory devices 123, 125 illustrated in FIG. 1, one of the memory devices 223, 225, 227 illustrated in FIG. 2, and/or the NAND memory device 333 illustrated in FIG. 3, herein), and an emerging memory device 439 (which can be analogous to one of the memory devices 123, 125 illustrated in FIG. 1 and/or one of the memory devices 223, 225, 227 illustrated in FIG. 2, herein).

The DRAM memory device 431 can include an array of memory cells that include at least one transistor and one capacitor configured to store a charge corresponding to a single data bit. The NAND memory device 433 can include various portions of memory cells, which can include a set of single level memory cells (SLCs) 435 and a set of multi-level memory cells (MLCs), such as a set of triple-level memory cells (TLCs) 437, which can be analogous to the SLC portion 335 and the TLC portion 337, respectively, illustrated and described in connection with FIG. 3, herein.

The emerging memory device 439 can be an emerging memory device, as described above. For example, the emerging memory device 439 can be a resistance variable (e.g., 3-D Crosspoint (3D XP)) memory devices, memory devices that include an array of self-selecting memory (SSM) cells, memory devices that operate according to a CXL protocol, etc., or any combination thereof.

FIG. 5 is a diagram illustrating an autonomous vehicle 541 that includes an electronic control unit (ECU) 501 in accordance with a number of embodiments of the present disclosure. As shown in FIG. 5, the autonomous vehicle 541 is in communication with a base station 543 via a communication path 545 and a satellite (e.g., a global positioning satellite) 547 via a communication path 549. The ECU 501 can be analogous to the ECU 101 illustrated in FIG. 1, herein. Although not explicitly shown in FIG. 5 so as to not obfuscate the drawings, the ECU 501 can include a memory system, such as the memory system 104, 204, 304, 404 illustrated in FIGS. 1-4, herein, and/or a host, such as the host 102 illustrated in FIG. 1, herein.

In a non-limiting example, the autonomous vehicle 541 can include a first memory device comprising a first type of media, a second memory device comprising a second type of media, and a processor coupled to the first memory device and the second memory device. The processor can be analogous to the processor 122, 222 illustrated in FIGS. 1-2, herein. Further, the first memory device can be analogous to the memory devices 123, 223 illustrated in FIGS. 1 and 2, herein, while the first type of media can be analogous to the media type 124, 224 illustrated in FIGS. 1-2, herein. Similarly, the second memory device can be analogous to the memory devices 125, 225 illustrated in FIGS. 1 and 2, herein, while the second type of media can be analogous to the media type 126, 226 illustrated in FIGS. 1-2, herein. Embodiments are not so limited, however, and the first memory device or the second memory device can be analogous to the various types of memory devices discussed in connection with FIGS. 3-4, herein.

The processor can execute instructions to determine driving patterns associated with an authorized operator of the autonomous vehicle. In some embodiments, the processor execute one or more sets of machine learning instruction to determine the driving patterns associated with the authorized operator of the autonomous vehicle over time.

The processor can perform an authentication operation using the determined driving patterns and information received from a global positioning satellite, a base station, and at least one internal sensor associated with the autonomous vehicle to determine whether a current operator of the vehicle is the authorized operator of the vehicle. In some embodiments, the internal sensor can be analogous to the internal sensor(s) 113 illustrated in FIG. 1, herein.

The processor can determine whether the autonomous vehicle has experienced a vehicle event. As described herein, the vehicle event can include at least one of the vehicle stopping for greater than a threshold period of time, starting, or detection of a change in captured the internal vehicle sensor data, or any combination thereof.

The processor can re-allocate computing resources between the first memory device and the second memory device in response to the determination that the autonomous vehicle has experienced the vehicle event. For example, in some embodiments, the processor can transfer information stored in the first memory device to the second memory device to increase an amount of available memory resources associated with the first memory device in response to the determination that the autonomous vehicle has experienced the vehicle event. Embodiments are not so limited, however, and in some embodiments, the processor can re-allocate computing resources between the first memory device and the second memory device in response to determining that the first memory device exhibits at least one of a higher bandwidth or a faster memory access time, or both, than the second memory device or that the second memory device exhibits at least one of a higher bandwidth or a faster memory access time, or both, than the first memory device.

In some embodiments, the processor can re-allocate the computing resources between the first memory device and the second memory device based, at least in part, on determined environmental characteristics in which the vehicle is operating.

The processor can perform, using the re-allocated computing resources, a subsequent authentication operation using the determined driving patterns and the information received from the global positioning satellite and the base station to determine whether the current operator of the autonomous vehicle is the authorized operator of the autonomous vehicle.

As described above, in some embodiments, the processor can in response to a determination that the current operator of the autonomous vehicle is not the authorized operator of the vehicle, transmit a notification to the authorized operator of the autonomous vehicle, disable the autonomous vehicle, or both. In the alternative, in some embodiments, the processor can in response to a determination that the current operator of the autonomous vehicle is the authorized operator of the autonomous vehicle, allow continued operation of the autonomous vehicle.

Figure 6:
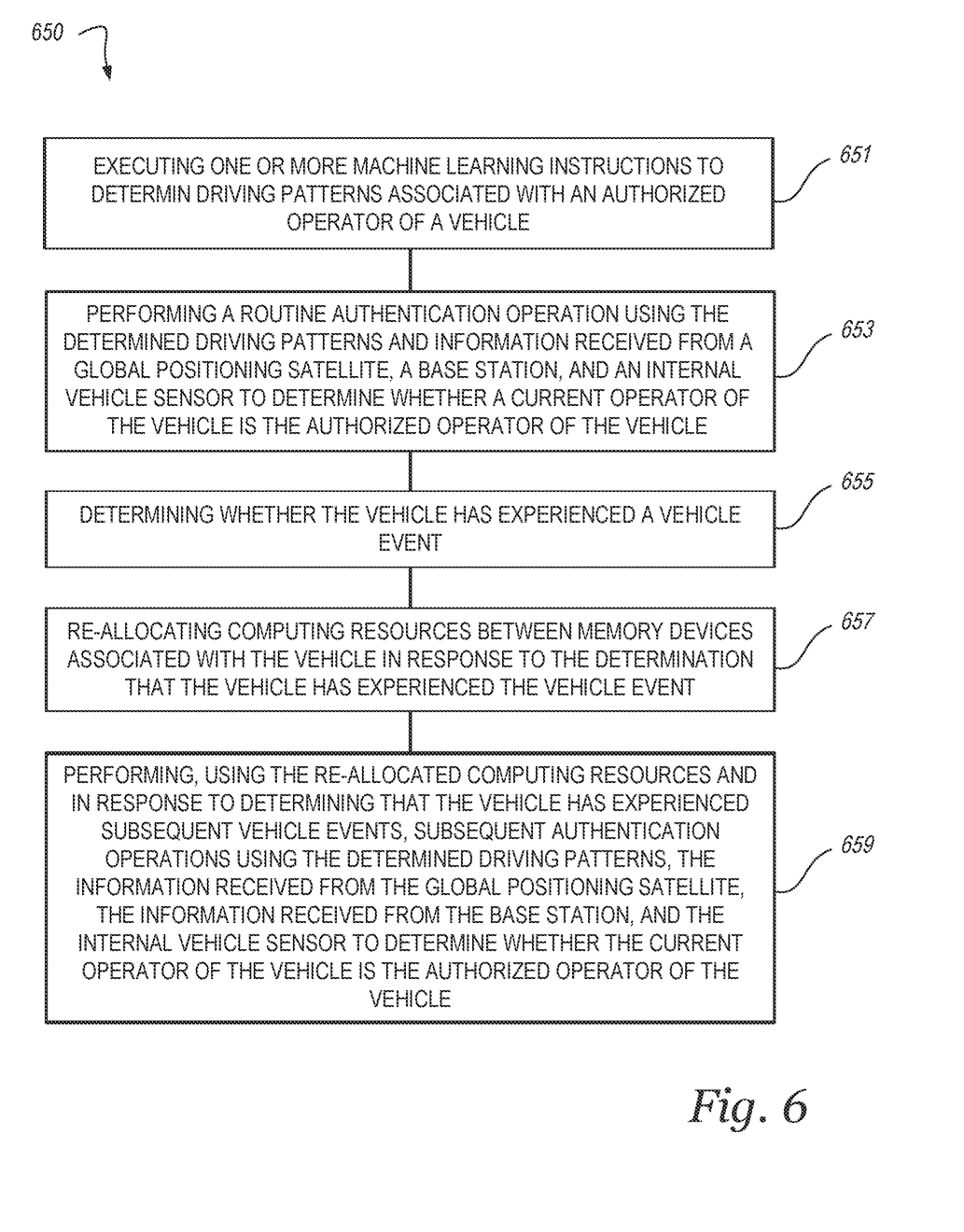
FIG. 6 is a flow diagram representing an example method corresponding to vehicle operator authentication operations in accordance with a number of embodiments of the present disclosure.

FIG. 6 is a flow diagram representing an example method corresponding to vehicle operator authentication operations in accordance with a number of embodiments of the present disclosure. The method 650 can be performed by processing logic that can include hardware (e.g., processor(s), processing device(s), control circuitry, dedicated logic, programmable logic, microcode, hardware of a device, and/or integrated circuit(s), etc.), software (e.g., instructions run or executed on a processor), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 651, the method 650 can include executing one or more machine learning instructions to determine driving patterns associated with an authorized operator of a vehicle.

For example, as described above, one or more machine learning instructions can be executed to predict and/or learn driving behavior of an authorized operator of the vehicle over time. This can allow for deviations from the learned driving patterns to be detected and can, in some embodiments, cause an application initiation indicator to be generated to cause performance of an authentication operation to determine whether the operator of the vehicle is the authorized operator of the vehicle.

At block 653, the method 650 can include performing a "routine" authentication operation using the determined driving patterns and information received from a global positioning satellite, a base station, and an internal vehicle sensor to determine whether a current operator of the vehicle is the authorized operator of the vehicle. As used herein, a "routine authentication operation" generally refers to an authentication operation that is performed upon start-up of the vehicle and again at regularly scheduled intervals during operation of an autonomous vehicle. A "routine authentication operation" may be performed independently of authentication operations (e.g., the subsequent authentication operation described in connection with block 659) that do not occur periodically or at scheduled intervals. For example, data from the GPS and the base station can be used as a two-way authentication to verify driving patterns of the operator of the vehicle to determine if they are consistent with those of the authorized operator, while the internal vehicle sensors can be used to detect the identity of the operator based on biometric data collected by the sensors and determine whether it is the authorized operator of the vehicle.

At block 655, the method 650 can include determining whether the vehicle has experienced a vehicle event. As described above, the vehicle event can include at least one of the vehicle stopping for greater than a threshold period of time, starting, and/or detection of a change in captured internal vehicle sensor data.

At block 657, the method 650 can include re-allocating computing resources between memory devices associated with the vehicle in response to the determination that the vehicle has experienced the vehicle event. In some embodiments, the method 650 can include re-allocating the computing resources between the memory devices associated with the vehicle such that greater than a threshold amount of computing resources that exhibit a higher bandwidth, a faster memory access time, and/or a lower latency than other computing resources available to the vehicle are available to perform the subsequent authentication operation.

At block 659, the method 650 can include performing, using the re-allocated computing resources and in response to determining that the vehicle has experienced subsequent vehicle events, subsequent authentication operations using the determined driving patterns, the information received from the global positioning satellite, the information received from the base station, and the internal vehicle sensor to determine whether the current operator of the vehicle is the authorized operator of the vehicle. In some embodiments, the method 650 can include performing, using the re-allocated computing resources, the subsequent authentication operations for each subsequent determined vehicle event while the vehicle is operating.

In some embodiments, the method 650 can include determining environmental characteristics in which the vehicle is operating and/or re-allocating the computing resources between the memory devices based, at least in part, on the determined environmental characteristics. As described above, non-limiting examples of environmental characteristics can include weather conditions, traffic conditions, the presence (or absence) of road construction (e.g., whether there are traffic barriers, road construction signs, detours, etc.), and/or the presence (or absence) of traffic signs (e.g., is the vehicle being operated on a highway that includes relatively few traffic signs as opposed to in a city that contains relatively more traffic signs), among other conditions that the vehicle may encounter during operation.

In some embodiments, the method 650 can include performing a traffic sequence prediction operation and/or re-allocating the computing resources between the memory devices based, at least in part, on the traffic sequence prediction operation. As used herein, the term "traffic sequence prediction operation" generally refers to performance of operations to estimate, determine, or otherwise predict an amount of objects (known or unknown) that the autonomous vehicle will encounter in the future. Traffic sequence prediction operations can include execution of deep-learning algorithms, and/or receipt of information from other autonomous vehicles on the road and/or from base stations in communication with the autonomous vehicle, among others. The traffic sequence prediction operation can be executed to determine a likelihood that the autonomous vehicle will experience a vehicle event within a given threshold period of time. For example, the traffic sequence operation can be executed to determine that the road is clear (e.g., minimal traffic, traffic signals, and/or road construction in the road for miles or kilometers), the road is not clear (e.g., there is heavy traffic ahead, a large quantity of traffic signals, and/or road construction in or near the road for miles and/or kilometers), or somewhere in between.

As described above, the memory devices can include a first memory device or a second memory device that can be a non-persistent memory device, and the other of the first memory device or the second memory device can be a persistent memory device. Further, as described herein, the processor, the first memory device, and the second memory device can be resident on an autonomous vehicle (e.g., the autonomous vehicle 541 illustrated in FIG. 5, herein). In such embodiments, the method 650 can include executing, performing, determining, re-allocating, and performing, by the processor in the absence of control signals generated external to the autonomous vehicle.

In some embodiments, the method 650 can include real-locating computing resources amongst the first memory device and the second memory device responsive to receiving an indication corresponding to initiation of an application. For example, in embodiments in which the indication corresponding to initiation of the application is an application initiation indicator, computing resources can be reallocated between the memory devices to ensure that an adequate amount of computing resources that exhibit particular characteristics (e.g., the fastest memory access times among the memory devices, the highest bandwidth among the memory device, etc.) are available to perform the authentication operations described herein.

At block, 655, the method 650 can include determining, by the processor, characteristics of a workload corresponding to execution of the application to process the data captured by the imaging device for the first memory device and the second memory device. The characteristics of the workload can include an amount of computing resources consumed in execution of the workload, an amount of processing time involved in execution of the workload, or an amount of power consumed in execution of the workload, among others.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a first memory device comprising a first type of media;
   a second memory device comprising a second type of media; and
   a non-transitory processor coupled to the first memory device and the second memory device, wherein the processor is configured to:
      perform an authentication operation using determined driving patterns associated with an authorized operator of a vehicle in which the apparatus is deployed and information received from a global positioning satellite and a base station to determine whether a current operator of the vehicle is the authorized operator of the vehicle;
      determine whether the vehicle has experienced a vehicle event;
      re-allocate computing resources between the first memory device and the second memory device in response to the determination that the vehicle has experienced the vehicle event; and
      perform, using the re-allocated computing resources, a subsequent authentication operation using the determined driving patterns and the information received from the global positioning satellite and the base station to determine whether the current operator of the vehicle is the authorized operator of the vehicle.

2. The apparatus of claim 1, wherein the non-transitory processor is further configured to re-allocate the computing resources between the first memory device and the second memory device based, at least in part, on determined environmental characteristics in which the vehicle is operating.

3. The apparatus of claim 1, wherein the non-transitory processor is further configured to perform at least one of the authentication operation or the subsequent authentication operation, or both, using internal vehicle sensor data using the re-allocated computing resources.

4. The apparatus of claim 1, wherein the vehicle event comprises at least one of the vehicle stopping for greater than a threshold period of time, starting, or detection of a change in captured internal vehicle sensor data, or any combination thereof.

5. The apparatus of claim 1, wherein the non-transitory processor is configured to execute one or more sets of machine learning instruction to determine the driving patterns associated with the authorized operator of the vehicle over time.

6. The apparatus of claim 1, wherein the non-transitory processor is configured to, in response to a determination that the current operator of the vehicle is not the authorized operator of the vehicle, transmit a notification to the authorized operator of the vehicle, disable the vehicle, or both.

7. The apparatus of claim 1, wherein the non-transitory processor is configured to, in response to a determination that the current operator of the vehicle is the authorized operator of the vehicle, allow continued operation of the vehicle.

8. The apparatus of claim 1, wherein the non-transitory processor is configured to determine characteristics of the first memory device and the second memory device prior to re-allocation of the computing resources between the first memory device and the second memory device, wherein the determined characteristics of the first memory device and the second memory include a bandwidth, a memory access time, a latency, a memory cell density, or any combination thereof, of the first memory device and the second memory device.

9. The apparatus of claim 1, wherein the non-transitory processor is configured to re-allocate the computing resources between the first memory device and the second memory device such that greater than a threshold amount of computing resources that exhibit a higher bandwidth, a faster memory access time, or a lower latency than other computing resources available to the vehicle are available to perform the subsequent authentication operation.

10. A method, comprising:
    a non-transitory processor executing one or more machine learning instructions to determine driving patterns associated with an authorized operator of a vehicle;
    performing a routine authentication operation using the determined driving patterns and information received from a global positioning satellite, a base station, and an internal vehicle sensor to determine whether a current operator of the vehicle is the authorized operator of the vehicle;
    determining whether the vehicle has experienced a vehicle event;
    re-allocating computing resources between memory devices associated with the vehicle in response to the determination that the vehicle has experienced the vehicle event; and
    performing, using the re-allocated computing resources and in response to determining that the vehicle has experienced subsequent vehicle events, subsequent authentication operations using the determined driving patterns, the information received from the global positioning satellite, the information received from the base station, and the internal vehicle sensor to determine whether the current operator of the vehicle is the authorized operator of the vehicle.

11. The method of claim 10, further comprising performing, using the re-allocated computing resources, the subsequent authentication operations for each subsequent determined vehicle event while the vehicle is operating.

12. The method of claim 10, further comprising re-allocating the computing resources between the memory devices associated with the vehicle such that greater than a threshold amount of computing resources that exhibit a higher bandwidth, a faster memory access time, or a lower latency, or any combination thereof, than other computing resources available to the vehicle are available to perform the subsequent authentication operation.

13. The method of claim 10, wherein the vehicle event comprises at least one of the vehicle stopping for greater than a threshold period of time, starting, or detection of a change in captured internal vehicle sensor data, or any combination thereof.

14. The method of claim 10, further comprising:
determining environmental characteristics in which the vehicle is operating; and
re-allocating the computing resources between the memory devices based, at least in part, on the determined environmental characteristics.

15. The method of claim 10, further comprising:
performing a traffic sequence prediction operation; and
re-allocating the computing resources between the memory devices based, at least in part, on the traffic sequence prediction operation.

16. A system, comprising:
an autonomous vehicle, comprising:
a first memory device comprising a first type of media;
a second memory device comprising a second type of media; and
a non-transitory processor coupled to the first memory device and the second memory device, wherein the processor is to:
execute instructions to determine driving patterns associated with an authorized operator of the autonomous vehicle;
perform an authentication operation using the determined driving patterns and information received from a global positioning satellite, a base station, and at least one internal sensor associated with the autonomous vehicle to determine whether a current operator of the vehicle is the authorized operator of the vehicle;
determine whether the autonomous vehicle has experienced a vehicle event;
re-allocate computing resources between the first memory device and the second memory device in response to the determination that the autonomous vehicle has experienced the vehicle event; and
perform, using the re-allocated computing resources, a subsequent authentication operation using the determined driving patterns and the information received from the global positioning satellite and the base station to determine whether the current operator of the autonomous vehicle is the authorized operator of the autonomous vehicle.

17. The system of claim 16, wherein the non-transitory processor is to transfer information stored in the first memory device to the second memory device to increase an amount of available memory resources associated with the first memory device in response to the determination that the autonomous vehicle has experienced the vehicle event.

18. The system of claim 16, wherein the non-transitory processor is to re-allocate computing resources between the first memory device and the second memory device in response to determining that the first memory device exhibits at least one of a higher bandwidth or a faster memory access time, or both, than the second memory device or that the second memory device exhibits at least one of a higher bandwidth or a faster memory access time, or both, than the first memory device.

19. The system of claim 16, wherein the non-transitory processor is configured to:
in response to a determination that the current operator of the autonomous vehicle is not the authorized operator of the vehicle, transmit a notification to the authorized operator of the autonomous vehicle, disable the autonomous vehicle, or both; or
in response to a determination that the current operator of the autonomous vehicle is the authorized operator of the autonomous vehicle, allow continued operation of the autonomous vehicle.

20. The system of claim 16, wherein the non-transitory processor is configured to execute one or more sets of machine learning instruction to determine the driving patterns associated with the authorized operator of the autonomous vehicle over time.

21. The system of claim 16, wherein the vehicle event comprises at least one of the vehicle stopping for greater than a threshold period of time, starting, or detection of a change in captured the internal vehicle sensor data, or any combination thereof.

22. The system of claim 16, wherein the non-transitory processor is further configured to re-allocate the computing resources between the first memory device and the second memory device based, at least in part, on determined environmental characteristics in which the vehicle is operating.

* * * * *